United States Patent
Coerman et al.

(10) Patent No.: US 11,433,891 B2
(45) Date of Patent: Sep. 6, 2022

(54) METHOD FOR OPERATING A MOTOR VEHICLE WITH ON-DEMAND ALL-WHEEL DRIVE

(71) Applicant: FORD GLOBAL TECHNOLOGIES, LLC, Dearborn, MI (US)

(72) Inventors: Cyril Coerman, Leverkusen (DE); Georg Johann Maurer, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 241 days.

(21) Appl. No.: 16/829,123

(22) Filed: Mar. 25, 2020

(65) Prior Publication Data

US 2020/0307588 A1 Oct. 1, 2020

(30) Foreign Application Priority Data

Mar. 26, 2019 (DE) ...................... 10 2019 204 174.4

(51) Int. Cl.
*B60W 10/119* (2012.01)
*B60W 30/18* (2012.01)
*B60W 10/02* (2006.01)

(52) U.S. Cl.
CPC ...... *B60W 30/18145* (2013.01); *B60W 10/02* (2013.01); *B60W 10/119* (2013.01);
(Continued)

(58) Field of Classification Search
CPC .......... B60W 30/18145; B60W 10/02; B60W 10/119; B60W 2510/0604; B60W 2510/0657; B60W 2520/266; B60W 2520/28; B60W 2520/30; B60W 2540/10; B60W 30/045; B60K 5/04; B60K 17/02;
(Continued)

(56) References Cited

U.S. PATENT DOCUMENTS 5,105,901 A * 4/1992 Watanabe .......... B60K 23/0808
180/245
6,564,134 B2 5/2003 Nishida et al.
(Continued)

FOREIGN PATENT DOCUMENTS

DE 102010045502 B4 9/2010

OTHER PUBLICATIONS

DE Examination Report DE 10 2019 204 174.4 Filed Jan. 13, 2020, 6 pages.

*Primary Examiner* — Justin Holmes
(74) *Attorney, Agent, or Firm* — Vincent Mastrogiacomo; Brooks Kushman P.C.

(57) ABSTRACT

A vehicle includes a powerplant, a front axle having first and second wheels and a differential operably coupled to the powerplant. A power-takeoff unit (PTU) is connected to the differential. A rear axle has third and fourth wheels and a gearbox connected to the PTU without a center differential. The gearbox has a first clutch configured to selectively couple the third wheel to the PTU and a second clutch configured to selectively couple the fourth wheel to the PTU. A controller is programmed to determine, during a turn, which of the third and fourth wheels is an outer rear wheel, determine whether there is a positive or negative torque on the outer rear wheel, and disengage, or keep disengaged, the one of the first and second clutches that is associated with the outer rear wheel in response to a negative torque on the outer rear wheel.

20 Claims, 2 Drawing Sheets

(52) U.S. Cl.
CPC ............... *B60W 2510/0604* (2013.01); *B60W 2510/0657* (2013.01); *B60W 2520/266* (2013.01); *B60W 2520/28* (2013.01); *B60W 2520/30* (2013.01)

(58) Field of Classification Search
CPC ............ B60K 2023/0833; B60K 23/08; B60K 17/354
See application file for complete search history.

(56) References Cited

U.S. PATENT DOCUMENTS

| | | |
|---|---|---|
| 7,007,763 B2 | 3/2006 | Ginther et al. |
| 7,111,702 B2 | 9/2006 | Perlick et al. |
| 8,296,022 B2 | 10/2012 | Severinsson et al. |
| 9,114,795 B2 | 8/2015 | Matsuno |
| 9,145,124 B2 | 9/2015 | Joeng |
| 2004/0104056 A1* | 6/2004 | Perlick .................. B60K 23/08 180/6.2 |
| 2013/0103228 A1 | 4/2013 | Suzuki |
| 2014/0046564 A1 | 2/2014 | Matsuno |
| 2018/0154882 A1 | 6/2018 | Sasaki et al. |
| 2018/0201129 A1 | 7/2018 | Coerman et al. |

* cited by examiner

METHOD FOR OPERATING A MOTOR VEHICLE WITH ON-DEMAND ALL-WHEEL DRIVE

CROSS-REFERENCE TO RELATED APPLICATIONS

This application claims foreign priority benefits under 35 U.S.C. § 119(a)-(d) to DE Application 10 2019 204 174.4 filed Mar. 26, 2019, which is hereby incorporated by reference in its entirety.

TECHNICAL FIELD

The present disclosure relates to a method for operating a motor vehicle with on-demand all-wheel drive.

BACKGROUND AND SUMMARY

All-wheel drive (AWD) refers to a drivetrain in which the driving power is transmitted to all wheels of the motor vehicle. A related drivetrain is four-wheel (4WD or 4×4). A common design includes an internal combustion engine (such as a gasoline or diesel engine), that powers a plurality of axles and wheels. All-wheel drives can be divided into two basic types: differential-controlled (also known as permanent all-wheel drives) and clutch-controlled.

Differential-controlled all-wheel drives have a central differential (also known as longitudinal differential) that divides the driving power between two axles and may be configured as a limited-slip differential.

Clutch-controlled all-wheel drives (also known as shiftable, hang-on, or on-demand) include a primary axle that is always coupled to the engine and a secondary axle that is only supplied with drive power under certain conditions. The clutch itself may be a claw clutch (manual shift), a visco-clutch, a centrifugal clutch, or an electronically controlled friction disk clutch. One advantage of clutch-controlled all-wheel drives is lower system costs and the possibility of designing the motor vehicle with brand-typical driving performance as a front-wheel drive or rear-wheel drive during normal operation and only switching to driving performance typical of all-wheel drives when required. A system with two individual partial clutches and no differentials makes it possible for the driving performance to be made more agile and, in the case of a front-wheel drive vehicle, for the driving performance of a vehicle with rear-wheel drive to be mimicked in some cases.

Known all-wheel drives include: U.S. Pat. No. 9,145,124 B2, U.S. Pat. No. 8,296,022 B2, U.S. Pat. No. 6,564,134 B2, DE 102010045502 B4, US 2018/0154882 A1 and US 2018/0201129 A1 and also from U.S. Pat. Nos. 5,105,901 A, 7,007,763 B2, 7,111,702 B2, 9,114,795 B2 and US 2013/0103228 A1, for example.

The absent differentials (central and rear-axle differential) and the automatic speed synchronization associated therewith may give rise to the following problems if both partial clutches are engaged in certain situations. Torsional stresses may occur in the drivetrain at low speed and with lateral acceleration. This manifests itself in loud noises during parking, for example, because the wheels have no speed synchronization, the shafts become stressed, and these stresses are rapidly reduced by scrubbing the tires. This leads to vibrations and noises.

Also, unwanted understeer on tight bends may occur. The following only applies when the on-demand axle is fitted to the rear axle. The outside wheel on bends cannot produce a positive torque due to the absent speed synchronization between the front axle and rear axle. The front axle runs on a narrower radius on bends than the rear axle; the difference is greater on tighter bends. If there is no speed synchronization, when the clutch of the rear wheel, which is on the outside on bends, is engaged the maximum speed is determined by the front axle and therefore the maximum slippage that can be achieved. If there is little slippage on the main drive axle and therefore a low speed, this means that on tight bends the rear outer wheel is braked when the partial clutch is engaged and a negative torque is thereby produced which in turn leads to an understeering yawing moment. When combined with the far greater positive slippage on the wheel which is on the inside on bends, an understeering yawing moment is produced in this case. By comparison with the wheel which is on the outside on bends, the inner wheel runs on a narrower radius. If both partial clutches are completely engaged, this is manifested in a greater slippage on the inner wheel, and therefore a higher torque. If in this case the partial clutches are engaged on a tight bend, a substantial torque can be applied which increases linearly as the radius becomes narrower as with the torque applied to the outer wheel. This leads to an understeering yawing moment which can further increase the moment occurring in the above example.

Additionally, greater tire wear due to tire scrubbing may occur as well as increased fuel consumption on account of the negative torques occurring as discussed above.

There is, therefore, a need for the operating points at which the aforementioned problems occur to be detected and for counter-measures to be taken, in order to avoid negative influences on the driving comfort and driving dynamics of a motor vehicle with an on-demand all-wheel drive of this kind without a central differential and without a rear axle differential.

The problem addressed by this disclosure is solved by a method for operating a motor vehicle with on-demand four-wheel drive, wherein the four-wheel drive is designed without a central differential and the rear axle is designed without an axle differential, wherein the motor vehicle has a first partial clutch for disengaging a first rear wheel from the drivetrain of the motor vehicle and a second partial clutch for disengaging a second rear wheel from the drivetrain of the motor vehicle. The method includes: determining which of the two rear wheels has to be treated as an outer rear wheel when the motor vehicle takes a bend; determining whether there is a positive or negative torque on the outer rear wheel; and disengaging, or keeping disengaged, at least the partial clutch which is assigned to the outer rear wheel of the motor vehicle when there is a negative torque on the outer rear wheel.

This disclosure proposes that, depending on the driving situation, the respective partial clutches should be disengaged, or kept disengaged, for example by suppressing a signal to engage the respective partial clutch, so that depending on the situation the rear wheel which is on the outside on bends, or also both rear wheels, can be disengaged from the drivetrain and the respective wheel can therefore be allowed to run freely, namely when there is a negative torque on the rear wheel in each case, i.e., this rear wheel would otherwise brake. By disengaging only the partial clutch which is assigned to the outer rear wheel, maximum traction can be provided. However, since the inner rear wheel transmits a torque, while the outer rear wheel does not, understeering occurs. By disengaging both partial clutches, or else keeping them disengaged, understeering can be simultaneously reduced but the traction is reduced at the same time. In this way, unwanted noise generation can be prevented, reduced oversteering or increased understeering avoided, and tire wear and also the fuel consumption of the motor vehicle reduced.

According to an embodiment, in order to determine whether there is a positive or negative torque on the outer rear wheel, a value which is representative of a speed of the outer front wheel in each case and another value which is representative of a speed of the inner front wheel in each case are evaluated. In other words, the respective speeds of the front wheels are regarded as indicative of whether there is a positive or negative torque on the outer rear wheel. The mean speed of the front wheels or else the front axle compared with the speed of the outer rear wheel represents the speed on both sides of the partial clutch on the outer rear wheel. A first part of the partial clutch is connected via the front differential, the PTU, and the reduction gearbox, directly to the mean speed of the front wheels or the front axle, while a second part of the partial clutch is directly connected to the outer rear wheel. The partial clutch transmits a positive or negative torque, depending on the differential speed of the first part and the second part of the partial clutch. In this way, it is particularly easy to determine whether there is a positive or negative torque on the outer rear wheel.

According to a further embodiment, in order to determine whether there is a positive or negative torque on the outer rear wheel, a mean value based on the value that is representative of a speed of the outer front wheel in each case and the other value that is representative of a speed of the inner front wheel in each case is determined and compared with a value that is representative of a motor vehicle speed. So, for example, the arithmetic mean made up of the value of a speed of the respective outer front wheel and the other value of a speed of the respective inner front wheel is added together and divided by 2 and the motor vehicle speed is subtracted from this. In addition, gear ratios may be taken into account according to their respective speed ratio. In this way, it is possible to determine whether there is a positive or negative torque on the outer rear wheel.

According to a further embodiment, speeds of the respective outer front wheel and the respective inner front wheel are detected and evaluated over a period of time. Measured values of these speeds are averaged over a prolonged period of time and measuring errors and signal noises are thereby reduced. This improves reliability of determining whether there is a positive or negative torque on the outer rear wheel.

According to a further embodiment, the method further comprises the following steps: detecting operating parameters of the drivetrain that are indicative of a torque output; and engaging the partial clutch which is assigned to the outer rear wheel of the motor vehicle when operating parameters of the drivetrain indicate increasing torque. In other words, a torque increase is anticipated and the respective partial clutch is engaged again before the torque becomes positive again. Hence, a drive moment can be provided in good time.

According to a further embodiment, slippage of the front wheels and/or actuation of the gas pedal are/is evaluated as operating parameters. In this case, increasing slippage on the front wheels points to acceleration of the motor vehicle, while gas pedal actuation or another signal is indicative of a power requirement following a driver command for acceleration of the motor vehicle. In particular, an imminent load change can thereby be detected.

In addition, the disclosure includes a computer program product and a control unit for carrying out a method of this kind and a motor vehicle having a control unit of this kind.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
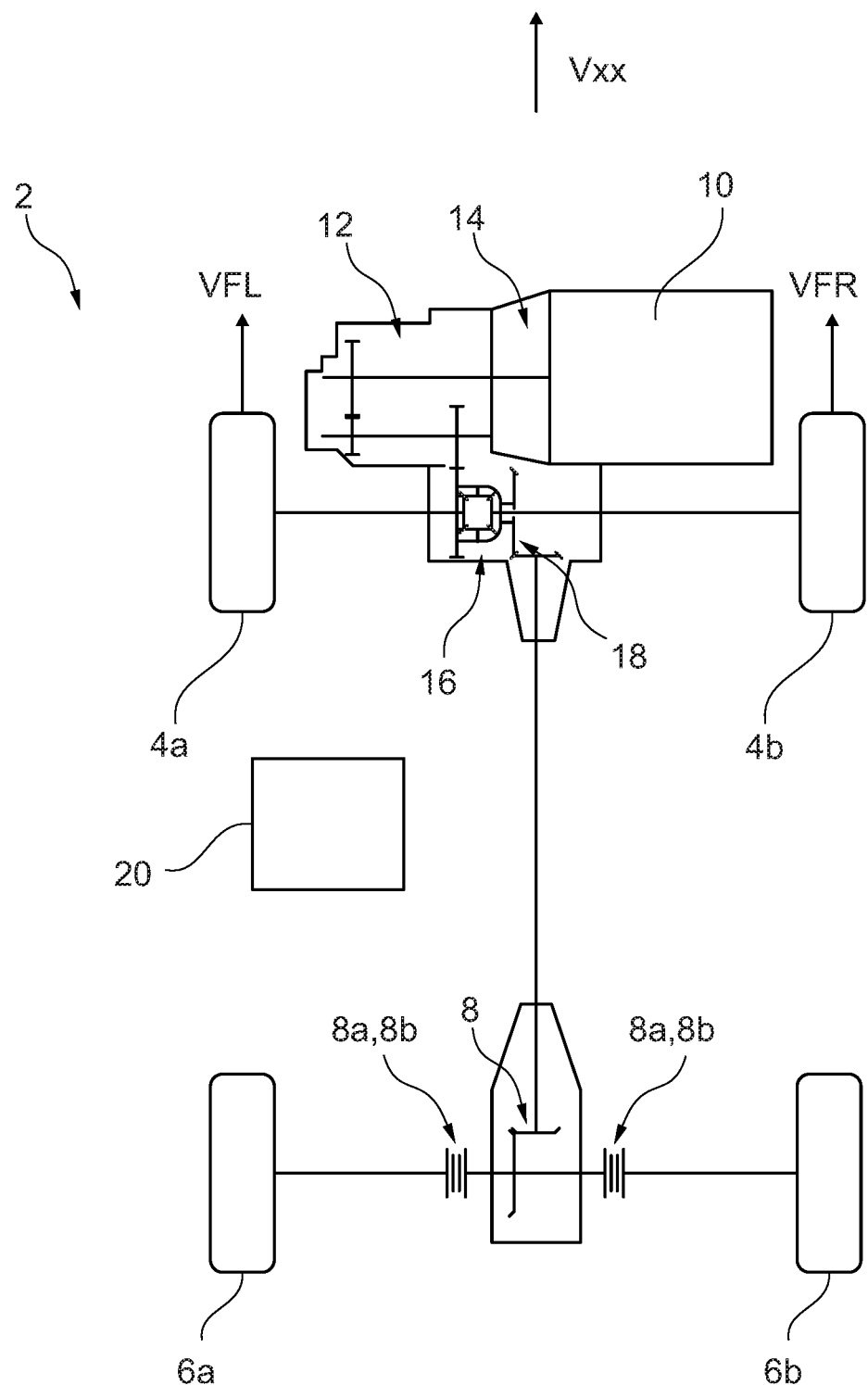
FIG. 1 shows a schematic representation of a motor vehicle while taking a bend.

Referring to FIG. 1, a motor vehicle 2, such as a passenger vehicle, is shown. The motor vehicle 2 has on-demand all-wheel drive in which the two front wheels 4a, 4b are permanent and the two rear wheels 6a, 6b are on-demand. The motor vehicle 2, in the present exemplary embodiment, has an engine 10, a manual transmission 12, and a clutch 14 arranged between the engine 10 and the transmission 12. For speed synchronization, a front differential 16 is provided between the front wheels 4a, 4b. A (power take-off unit) PTU 18 transmits torque to the rear wheels 6a, 6b. A reduction gearbox 8 is provided between the PTU 18 and the rear wheels 6a, 6b.

In FIG. 1, the vehicle is cornering a right-hand turn, and the left front wheel 4a is the outer front wheel, the right front wheel 4b is the inner front wheel, the left rear wheel 6a is the outer rear wheel, and the right rear wheel 6b is the inner rear wheel. When taking a left-hand turn, the front wheels 4a, 4b and rear wheels 6a, 6b case change their roles as outer and inner front wheels 4a, 4b or outer and inner rear wheels 6a, 6b.

A clutch assembly with a first partial clutch 8a and a second partial clutch 8b is between the two rear wheels 6a, 6b. The clutch assembly is operably coupled to the gearbox 8. The partial clutches 8a, 8b selectively couple the rear wheels 6a, 6b to the gearbox 8. Closing the clutches 8a, 8b engages all-wheel drive. When the clutches 8a, 8b are open, the rear wheels are disconnected from the engine. The first partial clutch 8a and the second partial clutch 8b are each configured as friction plate clutches in the present exemplary embodiment and are controlled by a control unit 20 depending on the driving situation, as will be explained in detail below. The control unit 20 may comprise hardware and/or software components for this purpose and for the tasks and function described below.

The motor vehicle 2, in the present exemplary embodiment, does not include a central differential nor a rear-axle differential. In other words, the all-wheel drive of the motor vehicle 2 may also be perceived as a clutch-controlled all-wheel drive.

Due to a lack of speed synchronization between the rear wheels 6a, 6b and the drivetrain which also drives the front wheels 4a, 4b, torsional stresses and noises can occur when turning, e.g., when parallel parking. When turning, the front wheels 4a, 4b follow a larger radius and have to move at higher speeds $V_{FL}$, $V_{FR}$ than the rear wheels 6a, 6b. The rear wheels 6a, 6b are, however, forced to adopt the average speed of the two front wheels 4a, 4b, insofar as the two partial clutches 6a, 6b on the rear axle are engaged. In addition, the two rear wheels 6a, 6b are forced to turn at the same speed when the clutches 8a, 8b are locked. Depending on the design of the chassis of the motor vehicle 2, this leads to understeer. Moreover, there may be greater wear, particularly of the tires on the rear wheels 6a, 6b, and increased fuel consumption.

In order to counteract this, a control unit 20 is designed to determine which of the two rear wheels 6a, 6b is to be treated as an outer rear wheel 6a, 6b when the motor vehicle 2 is taking a bend. In addition, the control unit 20 is designed to determine whether there is a positive or a negative torque on the outer rear wheel 6a, 6b. Furthermore, the control unit 20 is designed for disengaging, or keeping disengaged, the partial clutch 8a, 8b which is assigned to the outer rear wheel 6a, 6b of the motor vehicle 2 when a negative torque is present on the outer rear wheel 6a, 6b.

In order to determine whether there is a positive or negative torque on the outer rear wheel 6a, 6b, in the present exemplary embodiment the control unit 20 evaluates a value that is representative of a speed $V_{FL}$ of the outer front wheel 4a in each case and a further value which is representative of a speed $V_{FR}$ of the inner front wheel 4b in each case. In the present exemplary embodiment, the control unit 20 uses equation 1 for this purpose:

$$\text{sign}(Trq_{xx}) = \text{sign}\left[\frac{V_{FL} + V_{FR} * i_{PTU}}{2 * i_{RDU}} - V_{xx}\right] \quad \text{(Eq. 1)}$$

In this case, $V_{xx}$ stands for the speed of the outer rear wheel 6a, 6b, $i_{PTU}$ for a transmission ratio of the PTU 18, and $i_{RDU}$ for a transmission ratio of the reduction gearbox 8. The function sign ($Trq_{xx}$) supplies a value which is representative of whether there is a positive or negative value, i.e., torque, at the outer rear wheel 6a, 6b. In the present exemplary embodiment, a value of +1 represents a positive torque, a value of −1 represents a negative torque, and a value of 0 represents no torque.

In other words, an arithmetic mean based on the speed $V_{FL}$ of the respective outer front wheel 4a and the speed $V_{FR}$ of the respective inner front wheel 4b is determined. The arithmetic mean is then compared with the speed $V_{xx}$ of the outer rear wheel 6a, 6b. For this purpose, in the present exemplary embodiment, the speed $V_{xx}$ of the outer rear wheel 6a, 6b is subtracted from the arithmetic mean.

In order to minimize the influence of disruptive signals, the control unit 20 detects and evaluates values representative of a speed $V_{FL}$ of the outer front wheel 4a in each case and values representative of a speed $V_{FR}$ of the inner front wheel 4b in each case and also values representative of the speed $V_{xx}$ of the outer rear wheel 6a, 6b over a period of time.

In the present exemplary embodiment, the following formula (equation 2) is used for this purpose:

$$\text{Buffer}(t) = \int_{t0}^{t} \left(\frac{V_{FL} + V_{FR} * i_{PTU}}{2 * i_{RDU}} - V_{xx}\right)^3 \quad \text{(Eq. 2)}$$

In other words, there is a numerical integration over the predetermined period of time. The total value can then be compared with a threshold value, in order to determine whether the respective partial clutch 8a, 8b is to be disengaged or kept disengaged.

The cubic nature of the equation 2 ensures that small negative torques cannot lead to the threshold value being reached too quickly. The period of time starts to elapse as soon as a negative torque has been detected. The elapsing of the period of time is set back to zero when either the threshold value is reached or the torque is positive again.

Furthermore, in the present exemplary embodiment, the control unit 20 is designed to detect operating parameters of the drivetrain which are indicative of an increasing torque output. In addition, in the present exemplary embodiment, the control unit 20 is designed to engage the partial clutch 8a, 8b that is associated with the outer rear wheel 6a, 6b of the motor vehicle 2 when the operating parameters of the drivetrain are indicative of an increasing torque output. In this case, the operating parameters in the present exemplary embodiment involve increasing slippage at the front wheels 4a, 4b and/or gas pedal actuation which leads to increased slippage at the wheels. The slippage at the front wheels 4a, 4b may be slippage at one of the front wheels 4a, 4b in each case or at both front wheels 4a, 4b. In this way, a drive moment can be promptly provided, in particular also an imminent load change.

Figure 2:
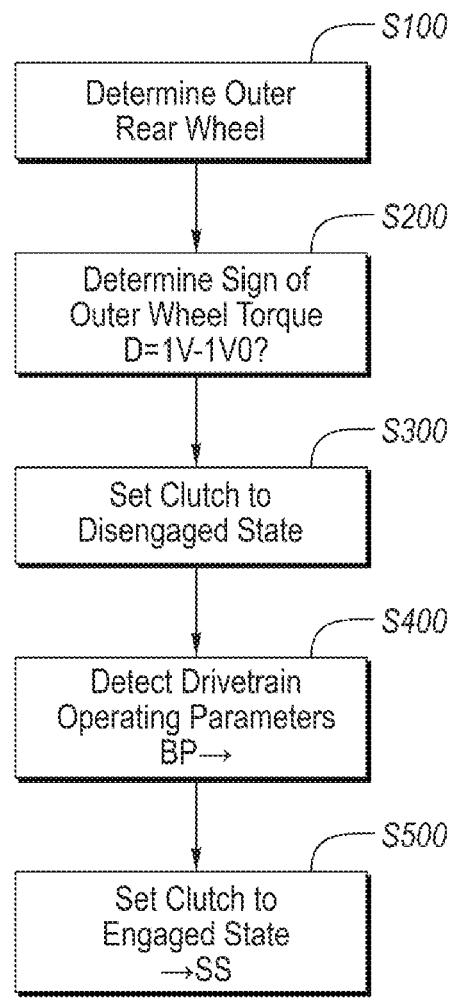
FIG. 2 shows a procedure for operating the motor vehicle shown in FIG. 1.

Referring to FIG. 2, a procedure for operating the motor vehicle 2 shown in FIG. 1 is explained. At a first step S100, the control unit 20 determines which of the two rear wheels 6a, 6b is to be treated as an outer rear wheel 6a, 6b when the motor vehicle 2 is taking a bend. If, for example, a right-hand bend is detected, the control unit 20 assigns the value 1 to a three-valued variable K in the present exemplary embodiment. If, on the other hand, a left-hand bend is detected, the control unit 20 assigns the value −1 to the variable K. During straight driving, the variable K is assigned 0. The respective rear wheel 6a, 6b is then selected according to the value of the variable K.

If the vehicle is taking a right-hand or left-hand bend, in a further step S200, the control unit 20 determines whether there is a positive or negative torque on the outer rear wheel 6a, 6b. If the control unit 20 has determined a positive torque, a three-valued variant D, in the present exemplary embodiment, is assigned the value 1. If, on the other hand, the control unit 20 has determined a negative torque, the variable D is assigned the value −1. If neither a positive nor a negative torque has been determined, the variable D is assigned the value 0.

For this purpose, the control unit 20 evaluates values that are representative of a speed $V_{FL}$ of the outer front wheel 4a in each case and further values that are representative of a speed $V_{FR}$ of the inner front wheel 4b in each case and also the value that is representative of a speed $V_{xx}$ of the outer rear wheel 6a, 6b.

In order to suppress signal noises, the control unit 20, in the present exemplary embodiment, detects a plurality of values that are representative of a speed $V_{FL}$ of the outer front wheel 4a in each case and a plurality of values that are representative of a speed $V_{FR}$ of the inner front wheel 4b in each case over a period of time and evaluates these.

In a further step S300, the control unit 20 command the partial clutch 8a, 8b associated with the outer rear wheel 6a, 6b of the motor vehicle 2, to be disengaged or kept disengaged by suppressing an engagement signal when there is a negative torque on the outer rear wheel 6a, 6b. The control unit 20 emits a corresponding disengagement signal OS for this purpose.

In a further step S400, the control unit 20 detects operating parameters BP of the drivetrain which are indicative of a torque output.

In a further step S500, the control unit 10 brings about engagement of the partial clutch 8a, 8b which is assigned to the outer rear wheel 6a, 6b of the motor vehicle 2 when the operating parameters BP of the drivetrain are indicative of an increasing torque output. In this case, increasing slippage at the front wheels 4a, 4b and/or gas pedal actuation are/is evaluated. The control unit 20 emits a corresponding engagement signal SS for this purpose. In this way, undesirable noise generation can be suppressed, reduced oversteering or increased understeering prevented, and tire wear and also fuel consumption by the motor vehicle 2 reduced.

While example embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method for operating a motor vehicle with on-demand all-wheel drive without a central differential, wherein the motor vehicle has a first partial clutch for disengaging a first rear wheel from a drivetrain of the motor vehicle and a second partial clutch for disengaging a second rear wheel from the drivetrain of the motor vehicle, the method comprising:
    determining, during a turn, which of the rear wheels is an outer rear wheel,
    determining whether there is a positive or negative torque on the outer rear wheel, and
    disengaging, or keeping disengaged, at least the partial clutch that is associated with the outer rear wheel in response to a negative torque on the outer rear wheel.

2. The method of claim 1, wherein the determination of the positive and negative torque is based on a speed of an outer front wheel and a speed of an inner front wheel.

3. The method of claim 2, wherein the determination of the positive and negative torque is further based on a mean value of the speeds of the front inner and outer wheels and a speed of the outer rear wheel.

4. The method of claim 1 further comprising:
    detecting operating parameters of the drivetrain that are indicative of a torque output; and
    engaging the one of the partial clutches associated with the outer rear wheel in response to the operating parameters indicating an increasing torque output.

5. The method of claim 4 wherein the operating parameters include slippage of front wheels and gas pedal actuation.

6. A vehicle comprising:
    a powerplant;
    front axle including first and second wheels and a differential operably coupled to the powerplant;
    a power-takeoff unit (PTU) connected to the differential;
    a rear axle including third and fourth wheels and a gearbox connected to the PTU without a center differential, the gearbox including a first clutch configured to selectively couple the third wheel to the PTU and a second clutch configured to selectively couple the fourth wheel to the PTU; and
    a controller programmed to:
        determine, during a turn, which of the third and fourth wheels is an outer rear wheel,
        determine whether there is a positive or negative torque on the outer rear wheel, and
        disengage, or keep disengaged, the one of the first and second clutches that is associated with the outer rear wheel in response to a negative torque on the outer rear wheel.

7. The vehicle of claim 6, wherein the controller is further programmed to, determine, during the turn, which of the first and second wheels is an inner front wheel and which of the first and second wheels is an outer front wheel.

8. The vehicle of claim 7, wherein the determination of the positive and negative torque is based on a speed of the outer front wheel and a speed of the inner front wheel.

9. The vehicle of claim 8, wherein the determination of the positive and negative torque is further based on a mean value of the speeds of the front inner and outer wheels and a speed of the outer rear wheel.

10. The vehicle of claim 6, wherein the controller is further programmed to engage the one of first and second clutches in response to an increasing torque output of the powerplant.

11. The vehicle of claim 6, wherein the controller is further programmed to engage the one of first and second clutches in response to a gas pedal being depressed.

12. The vehicle of claim 6, wherein the controller is further programmed to engage the one of first and second clutches in response to an increased slippage being sensed at the first or second wheels.

13. The vehicle of claim 6, wherein the powerplant is an engine.

14. The vehicle of claim 6, wherein the PTU is directly connected to the differential.

15. A control unit for operating a motor vehicle with on-demand all-wheel drive without a central differential, wherein the motor vehicle has a first partial clutch for disengaging a first rear wheel from a drivetrain of the motor vehicle and a second partial clutch for disengaging a second rear wheel from the drivetrain of the motor vehicle, the control unit comprising:
    a controller programmed to:
        determine, during a turn, which of the rear wheels is an outer rear wheel,
        determine whether there is a positive or negative torque on the outer rear wheel, and disengage, or keep disengaged, at least the partial clutch that is associated with the outer rear wheel in response to a negative torque on the outer rear wheel.

16. The control unit of claim 15, wherein the determination of the positive and negative torque is based on a speed of an outer front wheel and a speed of an inner front wheel.

17. The control unit of claim 16, wherein the determination of the positive and negative torque is further based on a mean valve of the speeds of the front inner and outer wheels and a speed of the outer rear wheel.

18. The control unit of claim 15, wherein the controller is further programmed to:
   detect operating parameters of the drivetrain that are indicative of a torque output; and
   engage the one of the partial clutches associated with the outer rear wheel in response to the operating parameters indicating an increasing torque output.

19. The control unit of claim 18 wherein the operating parameters include slippage of front wheels and gas pedal actuation.

20. The control unit of claim 15, wherein the controller is further programmed to engage the one of the partial clutches associated with the outer rear wheel in response to an increasing torque output of a powerplant.

* * * * *